United States Patent
Koenen

(10) Patent No.: US 12,418,208 B2
(45) Date of Patent: Sep. 16, 2025

(54) DISPLACEMENT BODY FOR A ROTOR AND CORRESPONDINGLY CONFIGURED ROTOR

(71) Applicant: Dr. Ing. h.c. F. Porsche Aktiengesellschaft, Stuttgart (DE)

(72) Inventor: Christian Koenen, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 267 days.

(21) Appl. No.: 18/326,072

(22) Filed: May 31, 2023

(65) Prior Publication Data

US 2023/0412016 A1 Dec. 21, 2023

(30) Foreign Application Priority Data

Jun. 13, 2022 (DE) .................. 10 2022 114 854.8

(51) Int. Cl.
 *H02K 1/26* (2006.01)
 *H02K 1/02* (2006.01)
 *H02K 1/32* (2006.01)

(52) U.S. Cl.
 CPC ............. *H02K 1/26* (2013.01); *H02K 1/02* (2013.01); *H02K 1/32* (2013.01)

(58) Field of Classification Search
 CPC .. H02K 1/26; H02K 1/02; H02K 1/32; H02K 3/52
 See application file for complete search history.

(56) References Cited

U.S. PATENT DOCUMENTS

| | | | | |
|---|---|---|---|---|
| 6,113,024 A | * | 9/2000 | Pittard | H02K 3/527 |
| | | | | 242/433 |
| 7,489,057 B2 | | 2/2009 | Zhou et al. | |
| 11,081,920 B2 | * | 8/2021 | Pal | H02K 3/527 |
| 11,837,943 B2 | * | 12/2023 | Håkansson | H02K 9/06 |

FOREIGN PATENT DOCUMENTS

| | | |
|---|---|---|
| DE | 102019212391 A1 | 2/2021 |
| DE | 102019214293 A1 | 3/2021 |
| JP | 2010045956 A | 2/2010 |
| JP | 2017050941 A | 3/2017 |
| WO | 2014024016 A2 | 2/2014 |

\* cited by examiner

*Primary Examiner* — Tulsidas C Patel
*Assistant Examiner* — Mohammed Ahmed Qureshi
(74) *Attorney, Agent, or Firm* — LEYDIG, VOIT & MAYER, LTD.

(57) ABSTRACT

A displacement body for a rotor, wherein the displacement body is configured to be inserted into a slot between two respective rotor teeth, includes a main part, a head part adjoining the main part, and at least one cooling channel, which extends through the displacement body in a depth direction. The head part includes a region flaring towards an outside of the displacement body. The displacement body is configured as a layer stack, which, in the depth direction, includes at least two adjoining layers.

8 Claims, 2 Drawing Sheets

DISPLACEMENT BODY FOR A ROTOR AND CORRESPONDINGLY CONFIGURED ROTOR

CROSS REFERENCE TO RELATED APPLICATIONS

This application claims benefit to German Patent Application No. DE 10 2022 114 854.8, filed on Jun. 13, 2022 which is hereby incorporated by reference herein.

FIELD

The present invention relates to a displacement body for a rotor, which can be inserted into a groove of a rotor, as well as a correspondingly configured rotor.

BACKGROUND

In externally excited synchronous machines, the generation of the magnetic field in the rotor occurs with a current-perfused coil (electromagnet). The magnetic flux of the rotor is variably adjustable over the excitation current flowing through the coil. The coil is often wound around a single leg pole.

In order to generate as strong a magnetic field as possible with the rotor in an externally excited synchronous machine, its rotor winding must be perfused with as large a current as possible and must have a high number of turns. In order to realize as high a number of turns as possible in the construction space of the winding, the rotor winding is made of a round wire having a small diameter. To ensure that this wire does not slip under the effects of centrifugal force, a wedge-shaped displacement body is used in order to fix the winding, which is usually made of a plastic.

By contrast to the rotor sheet, a higher loss density occurs in the rotor winding and thus also a significantly higher temperature than in the sheet package. The continuous output of externally excited synchronous machines is therefore generally limited by the heating of the rotor winding. The hottest point of the winding is generally relatively central and directly on the displacement body when viewed in the radial direction.

Due to the high rotor losses through the current in the rotor coils, a cooling of the rotor winding is required. As with other electrical machines, the heat dissipation from the rotor can be improved by a rotor shaft cooling. Such rotor shaft cooling is known, for example, from the U.S. Pat. No. 7,489,057 B2, in which the rotor shaft is axially perfused by a cooling fluid.

A further development of the rotor cooling compared to the embodiment mentioned in the aforementioned US patent provides for the spraying of oil from the cooling circuit of the transmission or the stator of the e-machine onto the winding heads of the rotor. In this concept, the heat is dissipated at the source of loss by comparison to rotor shaft cooling. However, it is disadvantageous that only the outer ends of the winding heads of the rotor are cooled, but not the rotor center.

In order to also dissipate the heat in the rotor center, the displacement bodies can be configured such that a channel for cooling the winding is integrated into each displacement body, thereby creating a groove channel in each groove. In order to equip the displacement body with the required cavities, a casting of the rotor winding with a plastic is required. This casting material also forms the structure for the cooling channel and the displacement body.

However, the provision of a cooling channel that can be perfused by a cooling medium within the rotor groove only constitutes the basic requirement for dissipating the waste heat generated during operation. In order to efficiently conduct this waste heat out of the winding into the cooling medium, a low thermal resistance between the winding and the cooling channel is required. If the cooling channel is configured in a plastic displacement body, the heat dissipation is hindered by the low thermal conductivity of the plastic, and the cooling potential is wasted.

SUMMARY

In an embodiment, the present disclosure provides a displacement body for a rotor, wherein the displacement body is configured to be inserted into a slot between two respective rotor teeth, comprising a main part, a head part adjoining the main part, and at least one cooling channel, which extends through the displacement body in a depth direction. The head part comprises a region flaring towards an outside of the displacement body. The displacement body is configured as a layer stack, which, in the depth direction, comprises at least two adjoining layers.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
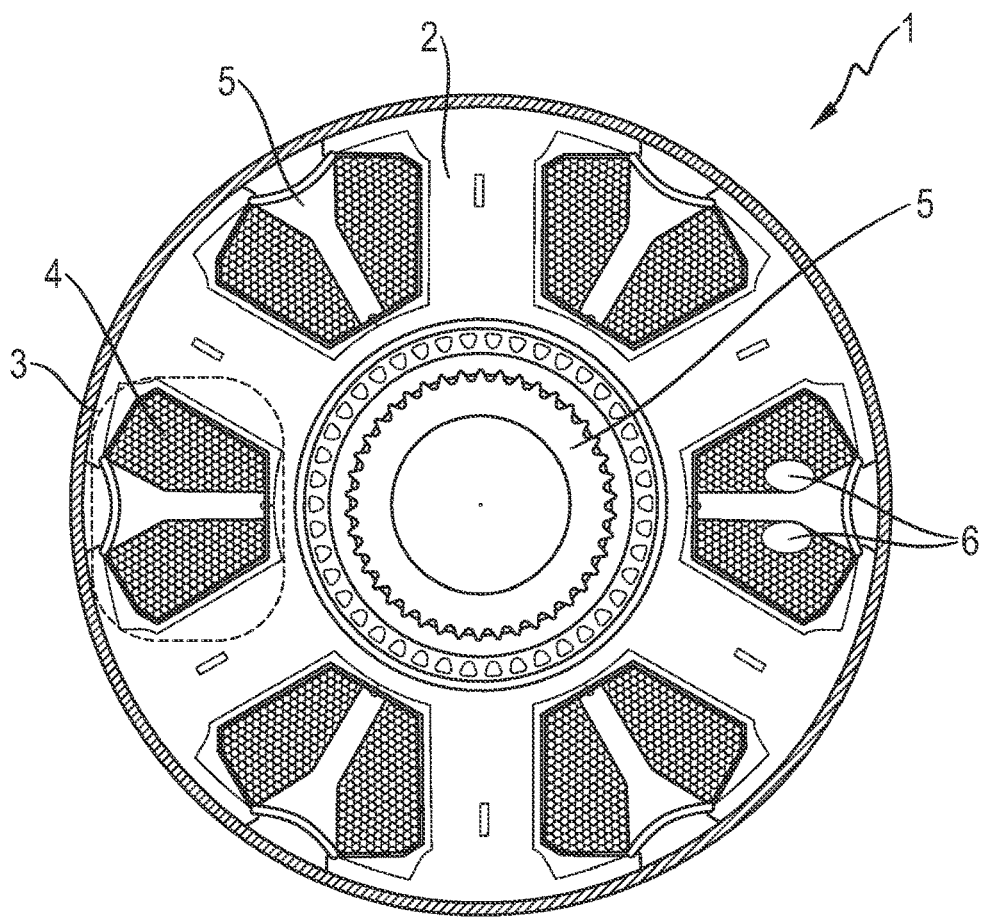
FIG. 1 shows the construction of a rotor of an externally excited synchronous machine with a groove channel cooling in displacement bodies according to the prior art.

In an embodiment, the present invention provides a possibility to cool a rotor winding as efficiently as possible without claiming additional design space. Embodiments of the invention are based on the basic idea of configuring the displacement body so that it has a better thermal conduction. According to an embodiment of the present invention, it can be designed for this purpose as a sheet package, i.e. as a stack of insulated sheets. This can help to avoid eddy current losses in the displacement body acting or used as the heat sink. The individual sheets can be made of, for example, aluminum. When sheets layered with an insulating material are assembled together, the layer stack corresponds functionally to an alternating arrangement of conductive and non-conductive layers. The stacking direction of the sheets is parallel to the axis of rotation of the rotor. In other words, the displacement body has a construction that is layered in the depth direction.

In such a configuration of the displacement body, instead of a poor heat-conducting plastic, a good heat-conducting metallic material is used in the displacement body that is perfused by the coolant. This allows the waste heat to be removed more efficiently, because the heat transfer from the rotor winding to the cooling medium improves. In order to prevent scattering losses in the metallic displacement body, the displacement body configured as a metallic heat sink can comprise a paramagnetic metal, e.g. aluminum.

In various embodiments, a displacement body is provided for a rotor, wherein the displacement body is configured so as to be inserted into a slot between two respective rotor teeth, which is also commonly referred to as the rotor groove. The displacement body can have a depth that corresponds to the axial extension of the rotor groove.

The displacement body comprises a main part and a head part adjoining thereto perpendicular to the depth extension of the displacement body, wherein the head part comprises a region which extends to the outside of the displacement body. The main part can have a rectangular shape, and the head part can have a trapezoidal shape adjoining thereto. The displacement body further comprises at least one cooling channel extending in the depth direction through the displacement body. The depth direction corresponds to the axial direction of the rotor when the displacement body is inserted therein. The displacement body is arranged as a layer stack, which comprises at least two adjoining layers in the depth direction. Preferably, the layer stack can comprise more than ten layers. In particular, a first layer can comprise an electrically conductive layer and a second layer can comprise an electrically non-conductive layer, wherein the first and second layers form an alternating layer sequence. In this case, two respectively adjoining insulating layers can be arranged as layers on the electrically conductive layer. In principle, all layers can have the same shape, i.e. they can rest against one another without a lateral overhang.

According to some embodiments of the displacement body, the layer stack can have a series of metallic layers that are insulated from one another. In the assembled state, the insulating protection layers of the sheets correspond to the insulating layers arranged between them.

According to some embodiments of the displacement body, the individual sheets can comprise a metallic material, preferably a paramagnetic metal, e.g. aluminum, which is also a relatively light metal.

According to some embodiments, the displacement body can further comprise at least one rib extending laterally outward from the main part of the displacement body. When the displacement body is inserted in the rotor groove, the rib extends perpendicular to the axial direction of the rotor groove and thus simultaneously into the conductor wires of the winding. Each rib can be rod-shaped in cross-section.

According to some embodiments of the displacement body, an equal number of ribs can each be arranged on each of two opposed sides of the displacement body. Preferably, the displacement body can have a mirror-symmetrical shape, with an equal number of ribs on each of the corresponding two sides of the main part of the displacement body.

According to some embodiments of the displacement body, the length of the ribs can decrease from the inner end of the main part to the outer end of the main part.

According to an embodiment of the present invention, there is further provided rotor for an electric motor, wherein the rotor comprises a sheet package in which rotor teeth are formed and a rotor winding is arranged in grooves formed between the rotor teeth, wherein, in at least a number of the grooves, a respective displacement body described herein is inserted in an axial direction of the rotor. For example, such a displacement body can be present in each rotor groove.

By using the displacement body according to embodiments of the invention in a stator of an electric machine, its continuous output can be increased due to higher thermal conductivity between the winding and the cooling channel. Further, an impairment of the electromagnetic properties of the electric machine can be avoided due to the layered construction of the heat sink, so that the electric machine can be operated at an unchanged high efficiency.

Furthermore, according to an embodiment of the present invention, there is provided an electric motor comprising a stator and a rotor mounted in the stator, which is configured with at least one displacement body described herein, as described in the previous paragraph.

It is understood that the aforementioned features and the features yet to be explained in the following can be used not only in the respectively specified combination, but also in other combinations or on their own, without leaving the scope of the present invention.

Additional advantages and configurations of embodiments of the invention follow from the description and the enclosed drawings.

In FIG. 1, an exemplary construction of a rotor 1 of an externally excited synchronous machine with a groove channel cooling in the displacement bodies 5 is illustrated. The rotor 1 comprises a rotor sheet package 2 in which rotor teeth are formed, which are spaced apart from one another by rotor grooves 3. The conductor wires 4 are arranged in each rotor groove 3, which in their entirety form the rotor winding. In each rotor groove 3, a wedge-shaped displacement body 5 is arranged in the radially outer region, which prevents the conductor wires 4 from slipping due to the effects of centrifugal force and thus fixes the rotor winding in the rotor grooves 3. The rotor 1 is supported on a rotor shaft 5.

Figure 2:
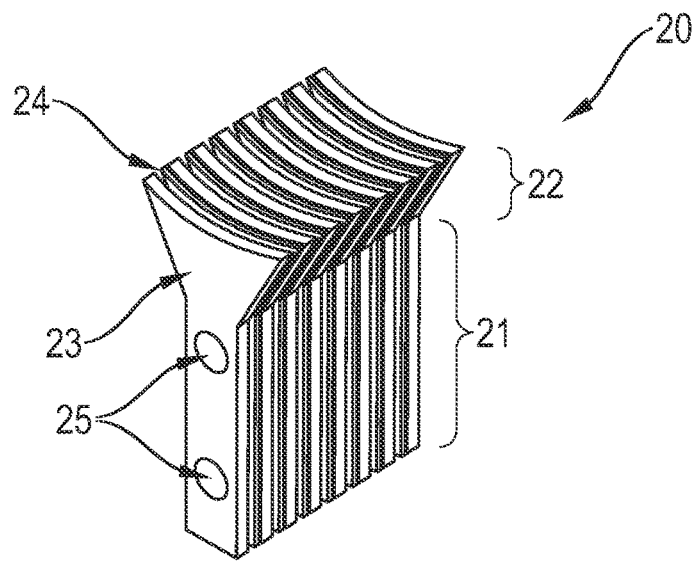
FIG. 2 shows a construction of a displacement body according to an embodiment of the invention with an axially layered construction.

In FIG. 2, an exemplary construction of a displacement body 20 according to an embodiment of the invention is shown with an axially layered construction. The displacement body 20 according to an embodiment of the invention is thus embodied as a sheet package, wherein it can be divided into a main part 21 and a head part 22 directly connected thereto. Each sheet 23 of the sheet package can be integrally formed and can have main and head portions 21, 22. Each sheet 23 is surrounded by an insulation layer 24, which is thus present in particular in the axial direction (depth direction of the displacement body 20) between the sheets 23 and thus acts as a separate layer. The stacking direction of the sheets 23 is parallel to the axis of rotation of the rotor 1 shown in FIG. 1. In order to ensure a good dissipation of the heat loss, two cooling channels 25 are provided, each of which extends in the depth direction through the displacement body 20.

Figure 3A:
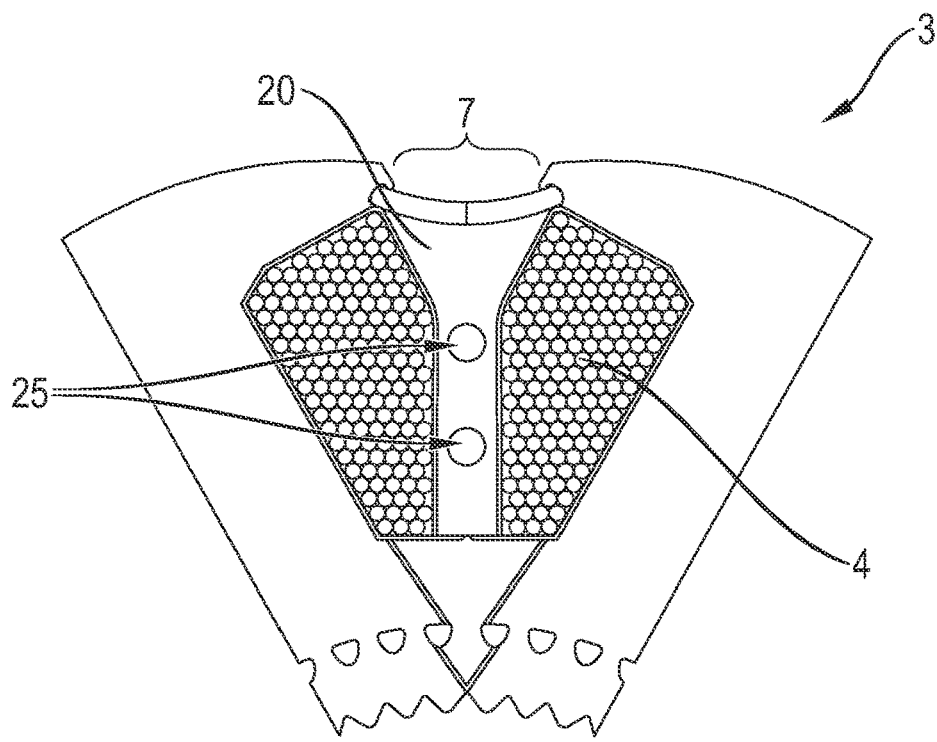
FIGS. 3A and 3B show embodiments of a displacement body inserted in a rotor groove.
Figure 3B:
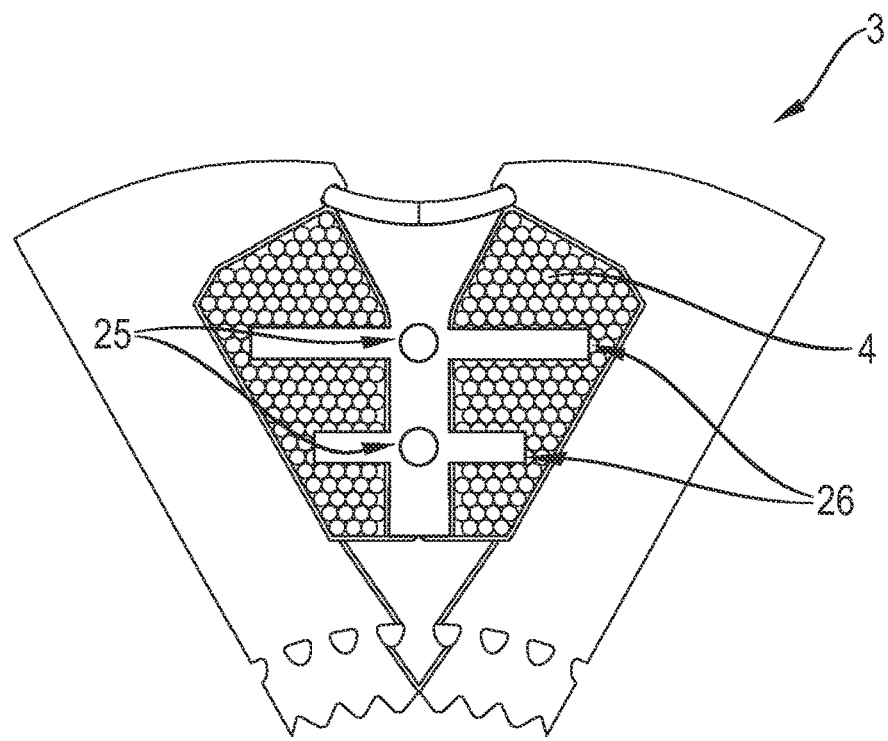

FIGS. 3A and 3B show further embodiments of the displacement body 20 inserted in a rotor groove 3 in a cross-sectional view in the plane of a rotor sheet. The displacement body 20 shown in FIG. 3A corresponds to the displacement body 20 shown in a cross-sectional view in FIG. 2. The displacement body 20 shown in FIG. 3B has ribs 26 projecting laterally outward from its main part. Each rib 26 arranged on one side of the main part has its counterpart on the opposite side of the main part. Further, it is shown that the length of the ribs 26 decreases as they are arranged closer to the outer and lower end of the main part of the displacement body 20, respectively. This can in particular be due to the shape of the rotor groove 3.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A displacement body for a rotor, wherein the displacement body is configured to be inserted into a slot between two respective rotor teeth, comprising:
    a main part;
    a head part adjoining the main part,
        wherein the head part comprises a region flaring towards an outside of the displacement body; and
    at least one cooling channel, which extends through the displacement body in a depth direction,
        wherein the displacement body is configured as a layer stack, which, in the depth direction, comprises at least two adjoining layers.

2. The displacement body according to claim 1, wherein the layer stack comprises a series of metallic layers that are insulated from one another.

3. The displacement body according to claim 2, wherein the metallic material comprises a paramagnetic metal.

4. The displacement body according to claim 1, further comprising at least one rib extending laterally outward from the main part of the displacement body.

5. The displacement body according to claim 4, wherein, on each of two opposed sides of the displacement body, an identical number of ribs is arranged.

6. The displacement body according to claim 5, wherein a length of the ribs decreases from an inner end of the main part to an outer end of the main part.

7. A rotor for an electric motor, wherein the rotor comprises a sheet package in which rotor teeth are formed and a rotor winding is arranged in grooves formed between the rotor teeth, and
    wherein, in at least a number of the grooves, a respective displacement body according to claim 1 is inserted in an axial direction of the rotor.

8. An electric motor comprising:
    a stator; and
    the rotor according to claim 7 mounted in the stator.

* * * * *